US008080899B2

(12) United States Patent
Paull

(10) Patent No.: US 8,080,899 B2
(45) Date of Patent: Dec. 20, 2011

(54) PHOTOVOLTAIC LADDER INVERTER

(75) Inventor: James B. Paull, Andover, MA (US)

(73) Assignee: Stellaris Corporation, North Andover, MA (US)

( * ) Notice: Subject to any disclaimer, the term of this patent is extended or adjusted under 35 U.S.C. 154(b) by 0 days.

(21) Appl. No.: 12/390,181

(22) Filed: Feb. 20, 2009

(65) Prior Publication Data

US 2009/0212629 A1 Aug. 27, 2009

Related U.S. Application Data

(60) Provisional application No. 61/030,424, filed on Feb. 21, 2008.

(51) Int. Cl.
*H02H 3/00* (2006.01)
(52) U.S. Cl. ............................................. 307/51; 307/63
(58) Field of Classification Search .................... 307/51, 307/63
See application file for complete search history.

(56) References Cited

U.S. PATENT DOCUMENTS

| 4,424,557 | A | * | 1/1984 | Steigerwald | 363/98 |
| 5,459,655 | A | * | 10/1995 | Mori et al. | 363/132 |
| 7,099,169 | B2 | * | 8/2006 | West et al. | 363/132 |
| 2005/0139259 | A1 | | 6/2005 | Steigerwald et al. | |
| 2005/0275386 | A1 | | 12/2005 | Jepsen et al. | |
| 2007/0236187 | A1 | | 10/2007 | Wai et al. | |
| 2009/0121549 | A1 | * | 5/2009 | Leonard | 307/51 |

OTHER PUBLICATIONS

International Search Report and Written Opinion dated Apr. 17, 2009 issued in related International Patent Application No. PCT/US2009/034723.

* cited by examiner

*Primary Examiner* — Jared Fureman
*Assistant Examiner* — Adi Amrany
(74) *Attorney, Agent, or Firm* — Grossman, Tucker, Perreault & Pfleger, PLLC

(57) ABSTRACT

Techniques for DC-to-AC conversion are disclosed, and may be embodied in a solar inverter device that can operatively couple to a power grid. The device includes a photovoltaic (PV) stack including series-connected PV modules. Each PV module is associated with a capacitor for storing output of that PV module. A positive terminator circuit switches a negative end of the PV stack to ground during positive half of grid cycle, and a negative terminator switches a positive end of the PV stack to ground during negative half of grid cycle. A connecting branch couples each PV module output to a common bus, each branch including control circuitry configured to selectively couple the corresponding PV module output to bus. During a first half of grid cycle, some of the capacitors discharge to the grid while a balance of the capacitors charge in preparation for discharge during a second half of grid cycle.

14 Claims, 5 Drawing Sheets

PHOTOVOLTAIC LADDER INVERTER

RELATED APPLICATIONS

This application claims the benefit of U.S. Provisional Application No. 61/030,424, filed on Feb. 21, 2008, which is herein incorporated by reference in its entirety.

FIELD OF THE INVENTION

The invention relates to power conversion, and more particularly, to techniques for DC-to-AC conversion in solar applications.

BACKGROUND OF THE INVENTION

There are many electronic devices that require or otherwise employ the conversion of DC electricity to AC electricity, typically by operation of an inverter. Such devices include, for example, solar inverters, variable frequency drives, and uninterruptible power supplies.

Solar inverters may be used, for instance, to convert the DC output of solar photovoltaic modules to an AC output that can be utilized by AC devices, or provided to an electric power grid. Uninterruptible power supplies typically use batteries to provide a DC source, which is then inverted to produce an AC output. Variable frequency drives typically rectify AC to produce DC, perform a DC to DC conversion to obtain a desired DC voltage level, and then invert this DC voltage to generate an AC voltage of desired frequency. Other DC-to-AC inverter applications will be apparent. The parameters and quality of the AC output provided by the inverter may vary depending on the particular demands of the target application. For instance, the AC output may range from a relatively crude square wave that is usable in non-critical applications, to a relatively smooth sine wave having a quality comparable to that generated by electric utilities or useable in critical applications (e.g., medical or military).

Conventional DC-to-AC inverters typically use pulse width modulation to simulate the electromotive force of alternating current. High speed electronic switching is usually employed to turn direct current on and off. The width of the pulses may be varied to simulate the effect of alternating current at a particular location in its sine wave. The polarity of these pulses may be alternated to then simulate the effect of the positive and negative characteristics of a sinusoidal waveform, through an H-bridge or similar mechanism, for example.

In any such cases, there are a number problems associated with conventional DC-to-AC inverter designs. For instance, the high-speed switching process may generate undesired harmonic frequencies. In addition, conventional inverter technologies are typically expensive and may contain complicated electronic circuits and many components, further increasing cost. Such high cost can be of particular concern in solar photovoltaic applications, as the cost of the inverters may represent a significant percentage of the overall photovoltaic system cost.

There is a need, therefore, for techniques that allow for efficient, cost-effective DC-to-AC conversion.

SUMMARY OF THE INVENTION

One embodiment of the present invention provides a solar inverter device for operatively coupling to an electrical power grid. The device includes a photovoltaic (PV) module stack including a plurality of series-connected PV modules, each PV module connected in parallel with a capacitor for storing output of that PV module. The device also includes a positive terminator circuit for switching a negative end of the PV module stack to ground during a positive half of grid cycle, and a negative terminator for switching a positive end of the PV module stack to ground during a negative half of the grid cycle. The device further includes a connecting branch from each PV module output to a common bus, each branch including branch control circuitry configured to selectively couple the corresponding PV module output to the common bus. During a first half of the grid cycle, one or more of the capacitors is discharging to the power grid while a balance of the capacitors are charging in preparation for their discharge during a second half of the grid cycle.

The device may further include a current control device operatively connected to the common bus, and for operatively connecting to the electrical power grid. Each of the connecting branches may further include a positive cycle switch and negative cycle switch, each controlled by a corresponding drive circuit included in the branch control circuitry. In one specific such case, at least some of the corresponding drive circuits include opto-couplers. In some such configurations, the opto-couplers is responsive to a control processor. In other such configurations, the opto-couplers are automatically controlled by reacting to differences between the line voltage of the power grid and instantaneous voltage of the PV module stack series connection. In one such configuration, the device further includes a constant current control circuit configured to maintain a relatively constant current through the opto-couplers. In some configurations, the device may be configured such that, in the absence of a grid line voltage, no output of the PV module stack is provided to the common bus.

In another specific configuration, during a positive half of the grid cycle, the positive terminator circuit operatively couples a first end of a current control inductor to ground and a second end of the current control inductor to the negative end of the PV module stack. In one such case, during a negative half of the grid cycle, the negative terminator circuit operatively couples the second end of a current control inductor to ground and the first end of the current control inductor to the positive end of the PV module stack. In another specific configuration, the device may further includes a positive cycle enable circuit configured for detecting a positive half of the grid cycle, and for coupling a detected positive half of the grid cycle to positive cycle branch control circuits included in the branch control circuitries. In one such case, the device may further include a negative cycle enable circuit configured for detecting a negative half of the grid cycle, and for coupling a detected negative half of the grid cycle to negative cycle branch control circuits included in the branch control circuitries.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

Techniques are disclosed that allow for efficient DC-to-AC conversion. The techniques may be implemented, for example, in a DC-to-AC inverter device that is relatively less expensive, includes significantly fewer components, and/or reduces or otherwise eliminates harmonics, relative to conventional DC-to-AC inverter designs. The techniques may be employed in any number of applications, such as in a system for converting discrete a DC source from a plurality of batteries or photovoltaic cells (or other suitable DC source) into a relatively smooth AC voltage output that may be used by AC devices and/or provided to an electric power grid. The system may be further configured to vary the output voltage from the inversion process to, for instance, ensure adequate voltage for the target application, or to allow for optimizing the output of a photovoltaic array to ensure maximum power point tracking.

Photovoltaic Ladder

Figure 1:
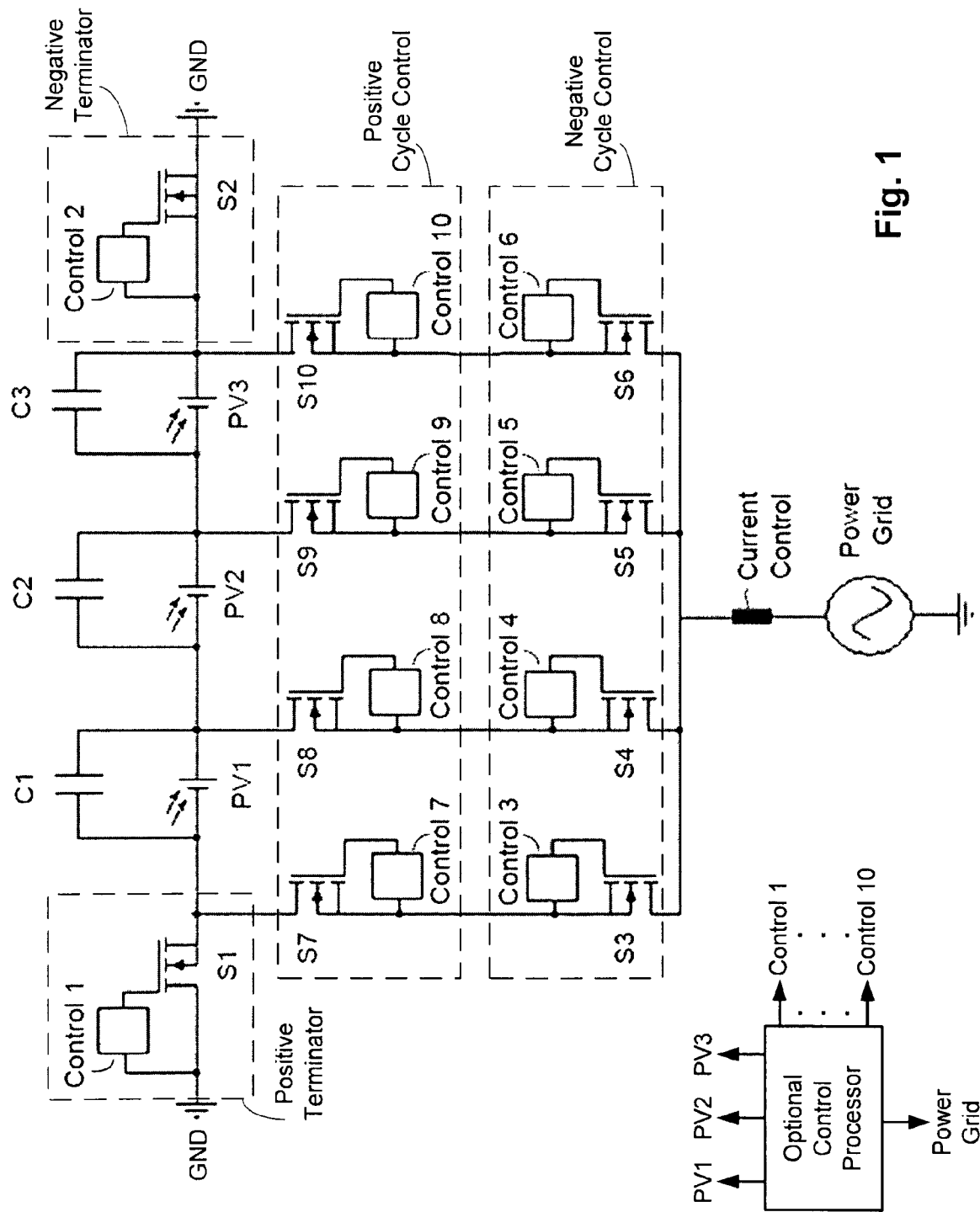
FIG. 1 illustrates a circuit diagram of a solar inverter configured with a photovoltaic ladder in accordance with an embodiment of the present invention.

FIG. 1 illustrates a circuit diagram of a solar inverter configured with a photovoltaic ladder in accordance with an embodiment of the present invention. The photovoltaic ladder design provides step-wise synthesis of a sinusoidal voltage output (similar to the output of multi-level or multi-step inverters).

A photovoltaic ladder system as described herein can be used, for example, as a device for inverting DC electricity (i.e., converting DC electricity into AC electricity), and may be configured to meet electrical power grid voltage or an other desired sinusoidal voltage output, effectively track the maximum power point, and make continuous use of the output of all the photovoltaic cells. The photovoltaic ladder system may also be used in supplying power to an electrical power grid with high efficiency, high power factor, and low harmonic distortion at relatively lower cost, as compared to conventional designs. A photovoltaic ladder configuration may eliminate many of the components of conventional inverter designs, using fewer and less expensive components that may be incorporated into solar systems or modules.

As can be seen, this example embodiment includes three solar photovoltaic modules (PV1-PV3) for ease of depiction, which are operatively coupled with a power grid. Other embodiments may include fewer (two solar photovoltaic modules) or more (e.g., twenty solar photovoltaic modules), depending on particulars and demands of the target application. The series connection of photovoltaic modules can generally be referred to as the PV module stack. Capacitors C1-C3 are connected in parallel with the photovoltaic modules PV1-PV3, respectively.

Electrical switches connect the output of the cells formed by the photovoltaic modules PV1-PV3 and capacitors C1-C3 to a common bus connection, which is in turn operatively coupled to the power grid. An optional Current Control device (such as a series inductor) may be connected between the bus and the power grid. In the example embodiment shown, switches S3-S6 (or a portion thereof) can be sequentially activated by operation of corresponding Controls 3-6 during the negative cycle of the power grid, and switches S7-S10 (or a portion thereof) can be sequentially activated by operation of corresponding Controls 7-10 during the positive cycle of the power grid. Inversion is accomplished by the positive and negative terminators, which alternatingly switch in ground (GND) to either end of the PV module stack. In this example embodiment, the positive terminator includes switch S1 and Control 1, and the negative terminator includes switch S2 and Control 2. In general, the positive terminator operates to connect the negative end of the PV module stack to ground during the positive half cycle, and the negative terminator operates to connect the positive end of the PV module stack to ground during the negative half cycle.

Each of the switches S1-S10 can be implemented, for example, with MOSFETS (or any other suitable switching mechanism as will be apparent in light of this disclosure). As previously discussed, these switches are controlled by their corresponding drive circuits (i.e., Controls 1-10), which can be implemented, for example, with opto-couplers. As can be seen, the opto-couplers may be responsive, for instance, to an optional control processor. This optional control processor can be implemented, for example, with a microprocessor or microcontroller configured with I/O capability for receiving signals from stack (e.g., PV1-PV3) and power grid, and one or more routines for generating control signals (e.g., Controls 1-10) for switches S1-S10, as described herein. Alternatively, the optional control processor may be used to control the switches S1-S10 directly (e.g., no opto-couplers, although such a direct control scheme may be susceptible to switching harmonics on switch output). Alternatively, and in the embodiment shown in FIG. 1, the opto-couplers may be automatically controlled by reacting to differences between the line voltage of the grid and the instantaneous voltage of the PV stack series connection. Specifically, the opto-couplers are driven by a relative voltage between the electrical grid and points on the PV stack series connection. The relative voltage difference may be used to turn on an appropriate MOSFET (or other switch) to maintain the number of PV modules in series connection so their collective output can be at a higher voltage than the grid voltage, thereby allowing power to be supplied to the grid.

During the first half of the grid cycle (e.g., positive cycle), one part of the overall circuit may be discharging to the power grid in parallel with storage capacitors corresponding to that part, while the balance of the overall circuit is charging capacitors in preparation for their discharge during the second half of a cycle. Conversely, during the second half of the cycle (e.g., negative cycle), the first part of the overall circuit is charging its corresponding capacitors in preparation for their discharge during the next half cycle. During any half cycle, an output may be produced by the parallel outputs of a PV module (e.g., PV1, PV2, or PV3) and its corresponding charged capacitor (e.g., C1, C2, or C3), and added with other such outputs in the series PV stack. Thus, the two parts of the overall circuit alternate between having the PV modules each further charge a partially charged capacitor, and then discharging that capacitor to the grid, which is at a somewhat lower potential.

At the point of the grid cycle when a PV module begins to re-charge a capacitor, the capacitor may have approached the voltage of the electrical grid at that point in the cycle. The PV module may charge the capacitor to a higher voltage, with the limiting voltage being the open-circuit voltage of the module (maximum output voltage of PV module). On the discharge part of the cycle, the PV module and its storage capacitor may operate in parallel, with both components meeting line voltage of the grid. The PV module may supply current corresponding to its performance characteristics at that voltage and its capacitor will partially discharge, its voltage approaching that of the electrical grid at that point in the cycle. Resistance in the MOSFETs (or other switch resistance) may mitigate current surges between the capacitor and line due to differences in voltages. In addition, or in the alternative, optional constant current control circuitry may also be used to mitigate such surges. As will be appreciated in light of this disclosure, properly sizing the capacitor may ensure that a voltage excursion during the cycle will be within the range of the maximum power point voltage.

Note that a control scheme that uses line voltage of the grid as a trigger to turn on appropriate MOSFETS (or other suitable switches) through opto-couplers as described herein may also be useful in eliminating islanding. As is known, islanding is the state where the photovoltaic array is producing electrical energy during periods when the grid is inoperative. In particular, in the absence of grid line voltage, no MOSFETS (or other suitable switches) are turned on and there would therefore be no voltage output provided by the PV module stack.

Thus, the photovoltaic ladder configuration as described herein is capable of synthesizing a sinusoidal voltage and with approximately constant current output by sequentially closing switches (e.g., a MOSFETs or other suitable switches) at the point in the series connection of the PV module stack that yields the an output voltage of the same magnitude (or greater) as the line voltage of the power grid. Anti-islanding capability is also provided.

Maximum Power Point Tracking and Meeting Grid Voltage

Figure 2:
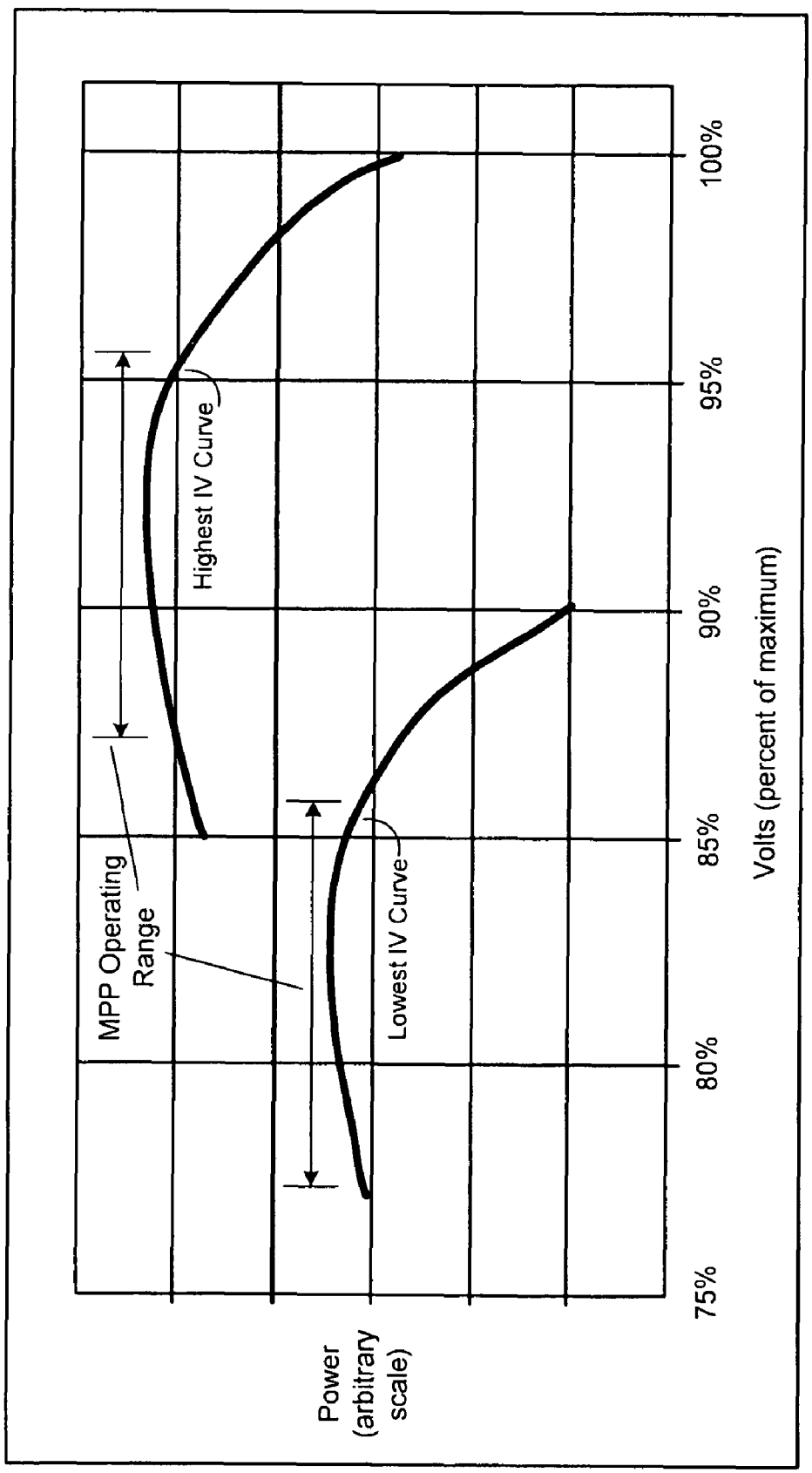
FIG. 2 is a diagram illustrating example photovoltaic power (I-V) curves for a power inverter configured in accordance with an embodiment of the present invention, and showing typical operating ranges and the loci of the photovoltaic module's maximum power points.

FIG. 2 is a diagram illustrating example photovoltaic power (I-V) curves for a power inverter configured in accordance with an embodiment of the present invention, and showing typical operating ranges and the loci of the photovoltaic module's maximum power points.

A sufficient number of photovoltaic modules connected in series generally provides sufficient voltage at the minimum voltage the photovoltaic array can be expected to generate to meet the line voltage of the grid, while at the same time ensuring that the photovoltaic array operates at its maximum power point (MPP). As is known, a photovoltaic cell has a single operating point (typically referred to as the maximum power point, or MPP) where the values of the cell's voltage (V) and current (I) effectively set a maximum power output. By utilizing voltage outputs along the series array of the PV stack, the control schemes described herein effectively allow tuning to a particular photovoltaic system. As such, the power grid voltage is met while assuring operation at maximum power.

As can be seen with reference to example power curves of FIG. 2, a lowest power curve is provided when the cell is operating in the range of about 77% to 90% of its maximum voltage output, and a highest power curve is provided when the cell is operating in the range of about 85% to 100% of its maximum voltage output. The corresponding MPP operating ranges are shown.

Figure 3:
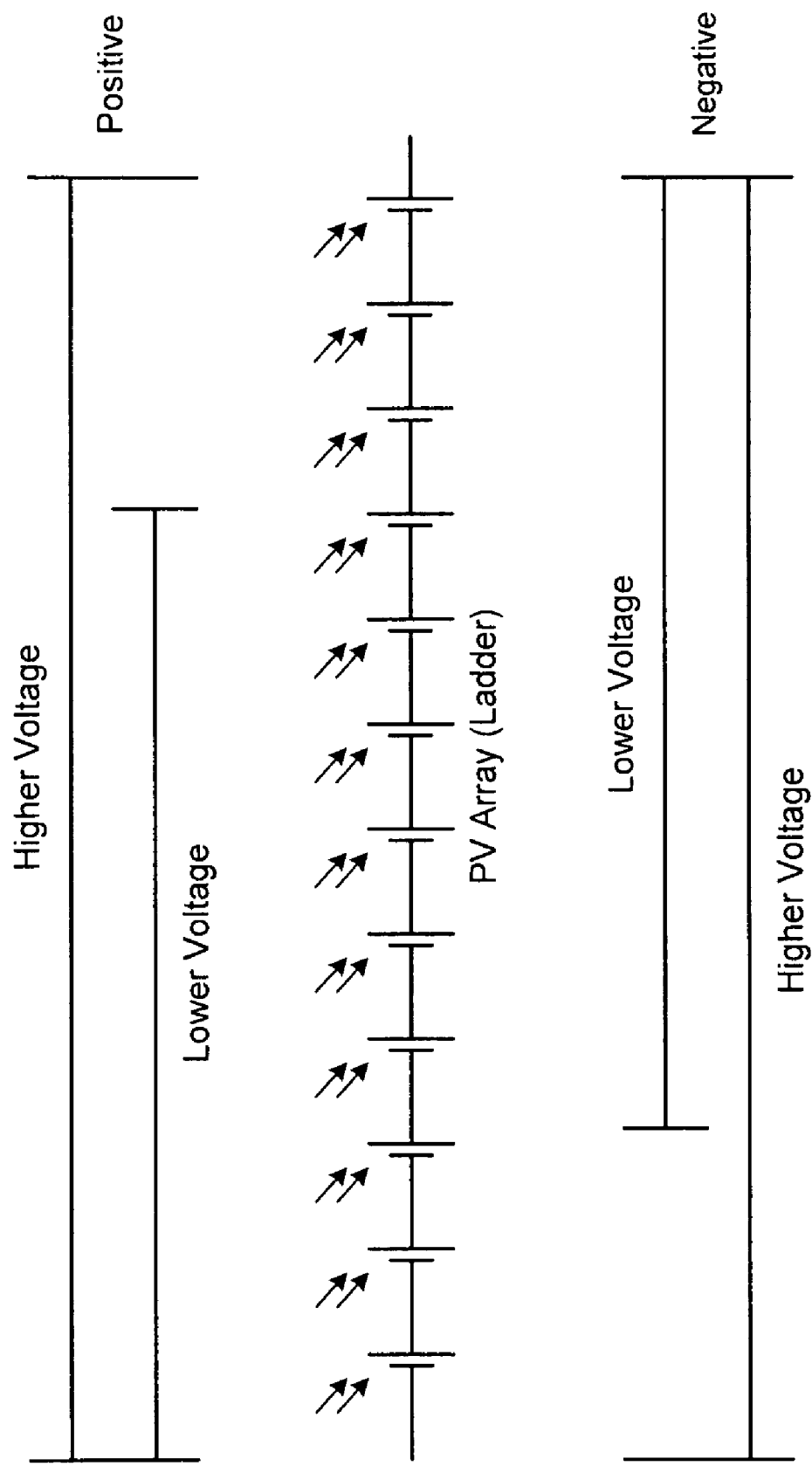
FIG. 3 is a diagram of the example excursions over a string of series-connected solar modules in a photovoltaic ladder configuration, for the circuitry to supply electrical energy to a grid at alternating voltage, in accordance with an embodiment of the present invention.

FIG. 3 is a diagram of the example excursions over a string of series-connected solar modules in a photovoltaic ladder configuration, for the circuitry to supply electrical energy to a grid at alternating voltage, in accordance with an embodiment of the present invention.

By adjusting the number of PV modules in series, the excursion of the break-point in the PV ladder may be controlled such that the individual modules, when connected in series to meet grid voltage, operate in the flat region of the PV power curves. Operation in the flat region may ensure both that the electrical grid voltage is met and that the array operates near the maximum power point. In the example shown in FIG. 3, nine of the twelve PV modules are switched in to provide the lower positive and negative voltage excursions, and all twelve PV modules are switched in to provide the higher positive and negative voltage excursions.

Solar Inverter Activated by Voltage Difference

Figure 4:
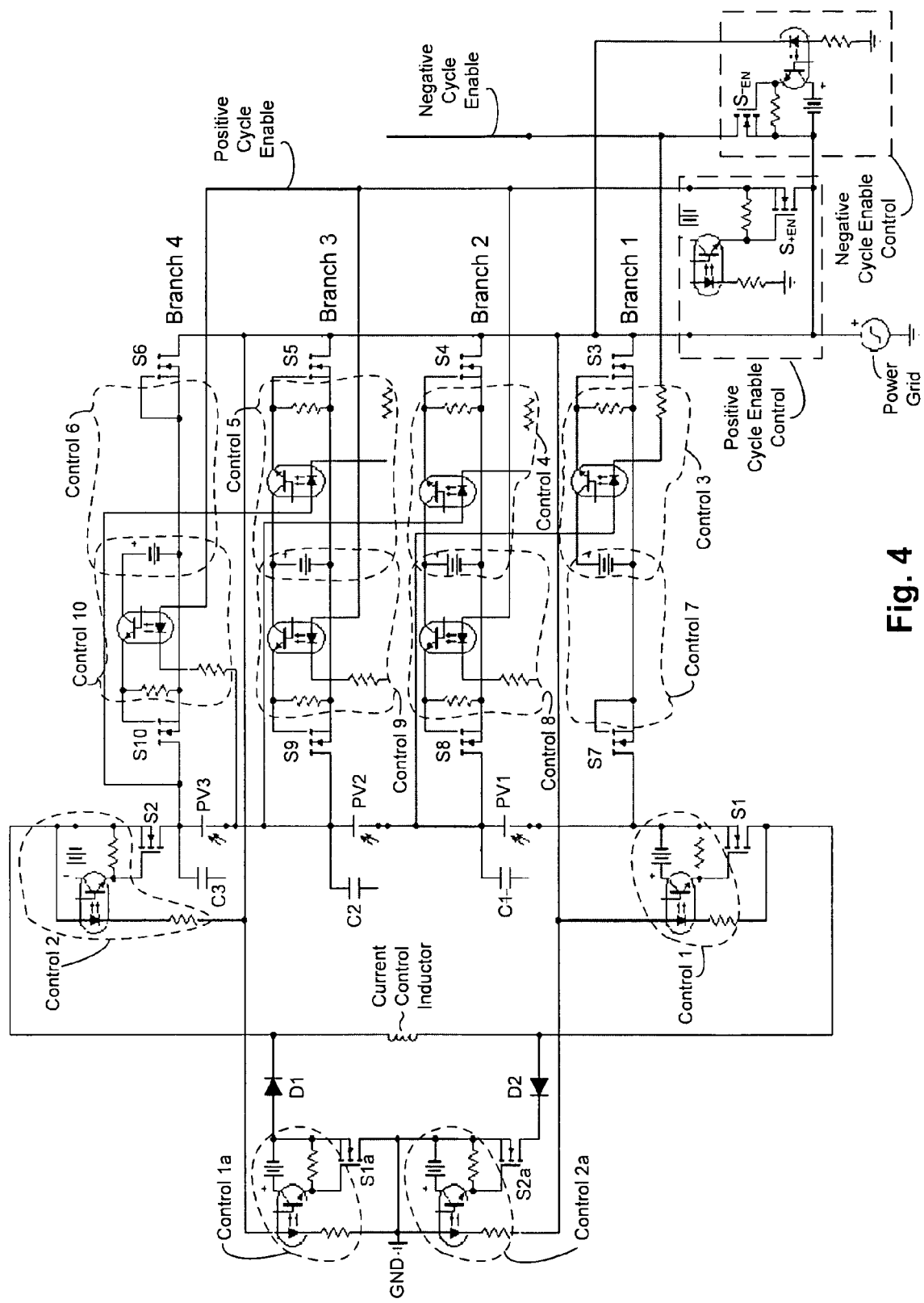
FIG. 4 illustrates a detailed schematic of a solar inverter configured with a photovoltaic ladder in accordance with an embodiment of the present invention.

FIG. 4 illustrates a detailed schematic of a solar inverter configured with a photovoltaic ladder in accordance with an embodiment of the present invention. As can be seen, this embodiment utilizes MOSFETs activated by opto-couplers which are in turn activated by voltage differences between the grid line voltage and the solar modules connected in series (PV stack).

This example embodiment uses three solar modules (PV1-PV3) in series; other embodiments may use more (or fewer) modules in series. Each of the solar modules PV1-PV3 is connected in parallel with a capacitor (C1-C3, respectively). As previously explained, the function of the capacitors C1-C3 is to store the output of the corresponding solar module PV1-PV3 when they are not discharging their electrical energy to the grid, and to help maintain a voltage across the solar modules PV1-PV3 so that they operate near or at their maximum power point.

Between each solar module and capacitor pair (e.g., PV1-C1, PV2-C2, etc), there is a connecting branch (Branches 1-4 are shown) leading to the power grid. On each of these branches, there are two switches (which are implemented as MOSFETs in this example, as are all S1-S10): one to switch the branch on during the positive half of the grid cycle, and the other to switch the branch on during the negative half of the grid cycle. For instance, Branch 2 is switched on during the positive half of the grid cycle by switch S8, and by switch S4 during the negative half of the grid cycle. Table 1 summarizes the overall switching scheme for this example embodiment, including the positive cycle switches and negative cycle switches for each branch.

TABLE 1

Switching Scheme

| Branch | Positive Cycle | Negative Cycle |
|---|---|---|
| 1 | S7 | S3 |
| 2 | S8 | S4 |
| 3 | S9 | S5 |
| 4 | S10 | S6 |

Each of the switches S3-S10 is in turn controlled by a corresponding control circuit (Control 3-10, respectively), and more specifically, by the output of an opto-coupler included in each control circuit. The control strategy for the opto-couplers will be described in turn.

A similar arrangement is used to invert the polarity of the series-connected solar module stack (PV1-PV3) to match the polarity of the alternating electric current in the power grid. As previously explained with reference to FIG. 1, a positive terminator connects the negative end of the PV module stack to ground during the positive half cycle, and a negative terminator connects the positive end of the PV module stack to ground during the negative half cycle.

In more detail, the positive terminator is implemented in the embodiment shown in FIG. 4 by switch S1 and Control 1 and a ground switching circuit including switch S1a and Control 1a, wherein during the positive half of the grid cycle, the opto-coupler in the Control 1a circuit is activated which turns on switch S1a, thereby operatively coupling ground (GND) to top-side (as depicted) of the current control inductor. Diode D1 is provided between S1a and the current control inductor, to stabilize inductor current. The other end of the current control inductor is connected to switch S1. As can be seen, the opto-coupler in the Control 1 circuit is also activated during the positive half of the grid cycle, which turns on switch S1, thereby connecting GND (through the current control inductor) to the end of the PV module stack. Switches S2 and 2a, and their respective control circuits Control 2 and Control 2a, are deactivated during the positive portions of the grid cycle.

The negative terminator is implemented in a similar fashion by switch S2 and Control 2 and a ground switching circuit including switch S2a and Control 2a, wherein during the negative half of the grid cycle, the opto-coupler in the Control 2a circuit is activated which turns on switch S2a, thereby operatively coupling GND to bottom-side (as depicted) of the current control inductor. Diode D2 is provided between S2a and the current control inductor, to stabilize inductor current. The other end of the current control inductor is now connected to switch S2. The opto-coupler in the Control 2 circuit is also activated during the negative half of the grid cycle, which turns on switch S2, thereby connecting GND (through the current control inductor) to the other end of the PV module stack. In alternative embodiments, such as the one shown in FIG. 1, recall that each of switches S1 and S2 may be connected directly to GND if so desired and the current control may be provided in series with the grid (also shown in FIG. 1).

The current control inductor configuration shown in FIG. 4 serves a number of beneficial purposes. For instance, it tends to maintain continuity of current through the solar module stack to ground. It also ensures that there is sufficient voltage across the solar modules PV1-PV3 to operate near their maximum power point, and for the solar module stack to have sufficient voltage to be able to discharge to the grid. In addition, the current control inductor buffers the current discharging from the capacitors C1-C3 into the grid, to avoid unacceptable resistance losses. In other embodiments, a current control inductor switched to maintain current flow as described herein, could also be used between the output of the PV ladder inverter and the grid (as shown in FIG. 1), either in place of or in concert with, the current control inductor between the solar module stack and ground (as shown in FIG. 4).

A similar switching-control arrangement is used in the example embodiment to implement the positive cycle enable control and negative cycle enable control circuits shown in the lower right corner of FIG. 4. In general, the positive cycle enable control circuit operates to provide the positive cycle enable to the corresponding control circuits (S8-S10 in the example depicted) during the corresponding positive half of the grid cycle. Similarly, the negative cycle enable control circuit operates to provide the negative cycle enable to the corresponding control circuits (S3-S5 in the example depicted) during the corresponding negative half of the grid cycle.

In more detail, during the positive half of the grid cycle, the opto-coupler in the positive cycle enable control circuit is activated which turns on switch $S_{+EN}$, thereby connecting the grid to the anode of the opto-coupler in each of control circuits, Control 8-10. In contrast, the opto-coupler in the negative cycle enable control circuit is deactivated which turns off the switch $S_{-EN}$, thereby disconnecting the grid from the cathode of the opto-coupler in each of control circuits, Control 3-5. During the negative half of the grid cycle, the opto-coupler in the negative cycle enable control circuit is activated which turns on switch $S_{-EN}$, thereby connecting the grid to the cathode of the opto-coupler in each of control circuits, Control 3-5. In contrast, the opto-coupler in the positive cycle enable control circuit is deactivated which turns off the switch $S_{+EN}$, thereby disconnecting the grid from the anode of the opto-coupler in each of control circuits, Control 8-10. Note that the Control 6 and its corresponding switch S6 are simplified (essentially operating as a diode), given their position at the end of the PV module stack. Similarly, Control 7 and its corresponding switch S7 are simplified (essentially operating as a diode), given their position at the other end of the PV module stack.

As will be appreciated, each of the control circuits, Control 1-10, include an opto-coupler (designated with transistor and LED as typically done), a shunt resistor (in parallel with the corresponding switch), a current limiting resistor (in series with the LED), and a power supply (designated with a battery as typically done). As will further be appreciated, such control circuitry may be implemented in a number of ways, and the present invention is not intended to be limited to any one particular configuration or set of sub-set of configurations. As will further be appreciated, the power supply shown in each control circuit (or sometimes shared between two control circuits, such as the one shared by Control 6 and Control 10) can be implemented with a local power supply or one or more batteries. The power can then be delivered to the PV ladder circuit using conventional technology (e.g., runs on a printed circuit board from the battery pack/power supply to each of the control circuits). Thus, a global power supply can be used, and each control circuit need not have its own individual power supply.

The solar inverter circuit is designed to automatically switch on Branches 1-4 as necessary to meet grid voltage and to discharge into it. In this embodiment, the opto-couplers in the branch control circuits (Control 3-10) sense the difference between the grid voltage and the voltage of the series-connected stack of PV modules. This ensures that there are more PV modules connected in series, at their respective voltages (as controlled by their capacitors connected in parallel and the current control inductor), such that there is a voltage potential between and current flow from the PV module stack to the grid. In other embodiments, this voltage potential may be adjusted or optimized by biasing the voltage across the branch opto-couplers or by utilizing other levels within the series-connected solar module stack.

In operation, when the positive half of the grid cycle begins, the positive voltage causes the opto-couplers of Control 1 and 1a to activate the MOSFET switches S1 and S1a of the positive terminator, thereby connecting the negative end of the solar stack to GND, and also activating the positive cycle enable control circuit that supplies the positive cycle enable to the positive cycle opto-couplers of branch control circuits, Control 8-10. At the beginning of the positive half cycle, only the PV1-C1 pair of Branch 2 supplies electricity to the grid through that branch. As the grid voltage increases, the differential of voltage between the grid and the positive end of the next PV module in the stack (PV2) becomes positive and triggers the positive cycle opto-coupler (Control 9) of Branch 3. This process continues up the PV stack as necessary as grid voltage continues, connecting higher voltage branches to meet grid voltage, with the solar modules above the active branch charging their respective capacitors while waiting to be connected to the grid. During the positive half cycle, the MOSFETs (S3-6) for the negative half of the grid cycle act as blocking diodes, thereby preventing a short circuit through the lower voltage branches. During the negative half of the grid cycle, the negative terminator connects the positive end of the solar module stack to GND, the negative cycle enable control circuit is activated, and the respective branch MOSFETs (S5-S3) for the negative half cycle switch on as the voltage differential dictates, starting with Branch 3 and moving toward Branch 1.

Thus, during the positive half of the grid cycle, a positive voltage is applied to the opto-coupler that turns on the MOSFET controlling the positive cycle enable control circuit. This positive enable circuit provides electricity to the opto-couplers corresponding to the MOSFETs on the branch circuits so that when the opto-couplers are triggered by differential voltage between the grid and the PV module stack, current will flow through the branch. The converse is true for the negative enable circuit.

Constant Current Control

Figure 5:
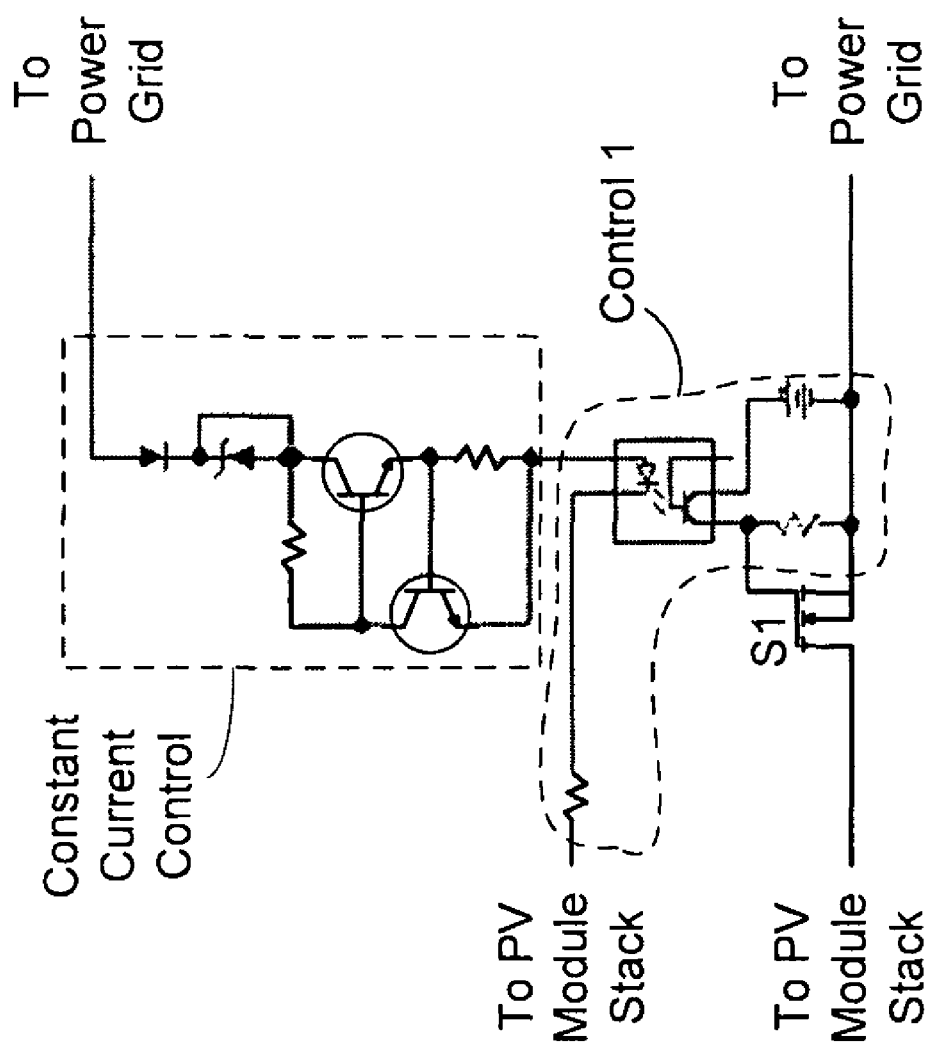
FIG. 5 illustrates an optional arrangement that can be employed when opto-coupler control is provided using the voltage differential between the grid and a point on the solar module stack, to maintain a relatively constant current through the opto-couplers, in accordance with an embodiment of the present invention.

FIG. 5 illustrates an optional constant current control circuit that can be employed when opto-coupler control is provided using the voltage differential between the grid and a point on the solar module stack, so as to maintain a relatively constant current through the opto-couplers, in accordance with an embodiment of the present invention. In this example configuration, a transistor circuit is used to maintain a relatively constant current through the opto-couplers, thus ensuring a more uniform performance of the switching branch circuit MOSFETs. The constant current control circuit of this example is shown operatively coupled to the opto-coupler of Control 1. However, the constant current control circuit can be used with any (all or subset) of Controls 1-10. Other embodiments may employ any suitable constant current control mechanisms, as will be appreciated in light of this disclosure.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A solar inverter device for operatively coupling to an electrical power grid, comprising:
a photovoltaic (PV) module stack including a plurality of series-connected PV modules, each PV module connected in parallel with a capacitor for storing output of that PV module;
a positive terminator circuit for switching a negative end of the PV module stack to ground during a positive half of grid cycle;
a negative terminator for switching a positive end of the PV module stack to ground during a negative half of the grid cycle; and
a connecting branch from each PV module output to a common bus, each branch including branch control circuitry configured to selectively couple the corresponding PV module output to the common bus, wherein during a first half of the grid cycle, one or more of the capacitors is discharging to the power grid while a balance of the capacitors are charging in preparation for their discharge during a second half of the grid cycle; and
wherein each of the connecting branches further comprises a positive cycle switch and negative cycle switch, each controlled by a corresponding opto-coupler included in the branch control circuitry, and the opto-couplers are automatically controlled by reacting to differences between the line voltage of the power grid and instantaneous voltage of the PV module stack series connection.

2. The device of claim 1 further comprising:
a current control device operatively connected to the common bus, and for operatively connecting to the electrical power grid.

3. The device of claim 1 wherein the opto-couplers are responsive to a control processor.

4. The device of claim 1 further comprising a constant current control circuit configured to maintain a relatively constant current through the opto-couplers.

5. The device of claim 1 wherein in absence of a grid line voltage, no output of the PV module stack is provided to the common bus.

6. The device of claim 5 wherein during a positive half of the grid cycle, the positive terminator circuit operatively couples a first end of a current control inductor to ground and a second end of the current control inductor to the negative end of the PV module stack.

7. The device of claim 5 wherein during a negative half of the grid cycle, the negative terminator circuit operatively couples the second end of a current control inductor to ground and the first end of the current control inductor to the positive end of the PV module stack.

8. The device of claim 1 wherein during a positive half of the grid cycle, the positive terminator circuit operatively couples a first end of a current control inductor to ground and a second end of the current control inductor to the negative end of the PV module stack.

9. The device of claim 8 wherein during a negative half of the grid cycle, the negative terminator circuit operatively couples the second end of a current control inductor to ground and the first end of the current control inductor to the positive end of the PV module stack.

10. The device of claim 1 further comprising:
a positive cycle enable circuit configured for detecting a positive half of the grid cycle, and for coupling a detected positive half of the grid cycle to positive cycle branch control circuits included in the branch control circuitries.

11. The device of claim 10 further comprising:
a negative cycle enable circuit configured for detecting a negative half of the grid cycle, and for coupling a detected negative half of the grid cycle to negative cycle branch control circuits included in the branch control circuitries.

12. A solar inverter device for operatively coupling to an electrical power grid, comprising:
a photovoltaic (PV) module stack including a plurality of series-connected PV modules, each PV module connected in parallel with a capacitor for storing output of that PV module;
a positive terminator circuit for switching a negative end of the PV module stack to ground during a positive half of grid cycle, wherein during a positive half of the grid cycle, the positive terminator circuit operatively couples a first end of a current control inductor to ground and a second end of the current control inductor to the negative end of the PV module stack;

a negative terminator for switching a positive end of the PV module stack to ground during a negative half of the grid cycle, wherein during a negative half of the grid cycle, the negative terminator circuit operatively couples the second end of a current control inductor to ground and the first end of the current control inductor to the positive end of the PV module stack; and a connecting branch from each PV module output to a common bus, each branch including branch control circuitry configured to selectively couple the corresponding PV module output to the common bus, wherein during a first half of the grid cycle, one or more of the capacitors is discharging to the power grid while a balance of the capacitors are charging in preparation for their discharge during a second half of the grid cycle;

wherein each of the connecting branches further comprises a positive cycle switch and negative cycle switch, each controlled by a corresponding opto-coupler included in the branch control circuitry, and the opto-couplers are automatically controlled by reacting to differences between the line voltage of the power grid and instantaneous voltage of the PV module stack series connection.

13. The device of claim 12 wherein in absence of a grid line voltage, no output of the PV module stack is provided to the common bus.

14. The device of claim 12 further comprising:

a positive cycle enable circuit configured for detecting a positive half of the grid cycle, and for coupling a detected positive half of the grid cycle to positive cycle branch control circuits included in the branch control circuitries; and a negative cycle enable circuit configured for detecting a negative half of the grid cycle, and for coupling a detected negative half of the grid cycle to negative cycle branch control circuits included in the branch control circuitries.

* * * * *